(12) United States Patent
Jaenker

(10) Patent No.: US 6,231,013 B1
(45) Date of Patent: May 15, 2001

(54) AIRFOIL MEMBER WITH A PIEZOELECTRICALLY ACTUATED SERVO-FLAP

(75) Inventor: Peter Jaenker, Garching (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/334,216

(22) Filed: Jun. 16, 1999

(51) Int. Cl.$^7$ .................................................. B64C 13/24
(52) U.S. Cl. .................... 244/215; 244/75 R; 416/23; 310/330; 60/528
(58) Field of Search ................................. 244/213, 214, 244/215, 216, 217, 75 R; 416/23, 24; 310/330, 328, 331; 60/528, 529

(56) References Cited

U.S. PATENT DOCUMENTS

| | | | |
|---|---|---|---|
| 2,025,561 | 12/1935 | Wilford . | |
| 2,031,177 * | 2/1936 | Northrop | 244/215 |
| 2,369,049 | 2/1945 | Hays . | |
| 2,716,460 | 8/1955 | Young . | |
| 2,776,718 | 1/1957 | Zuck . | |
| 3,358,949 * | 12/1967 | Harrison | 244/215 |
| 4,247,065 | 1/1981 | Grob et al. . | |
| 4,284,254 * | 8/1981 | Rieben | 244/75 R |
| 4,351,502 | 9/1982 | Statkus . | |
| 4,470,569 * | 9/1984 | Shaffer et al. | 244/213 |
| 5,114,104 * | 5/1992 | Cincotta et al. | 244/75 R |
| 5,224,826 | 7/1993 | Hall et al. . | |
| 5,348,124 * | 9/1994 | Harper | 244/158 R |
| 5,387,083 | 2/1995 | Larson et al. . | |
| 5,588,800 | 12/1996 | Charles et al. . | |
| 5,626,312 * | 5/1997 | Head | 244/75 R |
| 5,639,215 | 6/1997 | Yamakawa et al. . | |
| 6,070,834 | 6/2000 | Jaenker et al. . | |

* cited by examiner

Primary Examiner—Galen L. Barefoot
(74) Attorney, Agent, or Firm—W. F. Fasse; W. G. Fasse

(57) ABSTRACT

An airfoil member, especially a rotor blade for a helicopter, includes an airfoil body and a servo-actuated flap tiltably connected to the airfoil body so as to form at least a portion of the trailing edge of the airfoil member. At least one piezoelectric actuator is arranged inside the airfoil member, and connected to the servo-flap via a transmission mechanism and a connecting rod linkage so as to tiltingly deflect the servo-flap as needed. Preferably, two counter-acting piezoelectric actuators are connected to the flap via respective transmission mechanisms and connecting rod linkages. An elongation of the piezoelectric actuators in the span width direction of the airfoil member is converted or redirected into an actuating motion in the chord length direction of the airfoil member by the transmission mechanisms. Orienting the actuators to have an elongation motion in the span width direction prevents the high centrifugal accelerations arising in the rotor blade from having negative influences on the operation of the actuators.

18 Claims, 1 Drawing Sheet

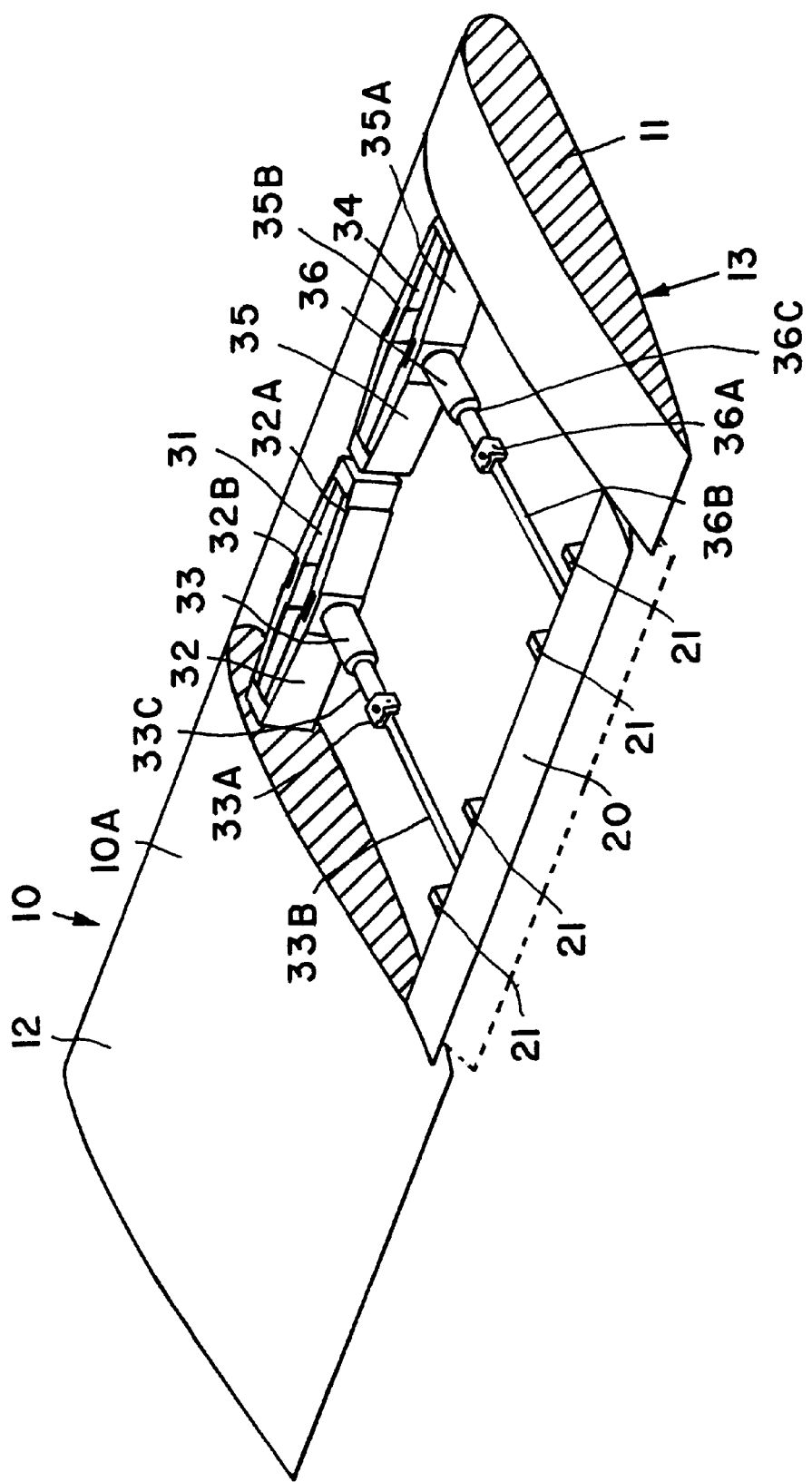

AIRFOIL MEMBER WITH A PIEZOELECTRICALLY ACTUATED SERVO-FLAP

CROSS-REFERENCE TO RELATED APPLICATION

This application is related to copending U.S. application Ser. No. 09/150,356, filed Sep. 9, 1998 of the same inventor.

FIELD OF THE INVENTION

The invention relates to an aerodynamically contoured member generally referred to as an airfoil member herein, which is especially a rotor blade for a helicopter, having a servo-actuated control surface or servo-flap pivotally connected so as to form a portion of the trailing edge of the airfoil member, and having one or more servo-actuators for positioning the servo-flap.

BACKGROUND INFORMATION

In comparison to conventional fixed wing aircraft, helicopters exhibit several advantages. For example, the ability to carry out a vertical take-off and landing makes it possible to operate and maneuver a helicopter in areas having very limited or confined space. Moreover, the ability to fly at a very low forward ground speed makes the helicopter suitable for use in various surveillance operations, and the ability to hover makes the helicopter the principally suitable aircraft for use in search and rescue operations.

Both the vertical lift and the forward thrust for achieving the climb, hovering, and forward flight of the helicopter are generated by the rotation about a rotor mast, of the aerodynamically contoured airflow profile members, which are generally called airfoil members herein, and which are particularly called rotor blades in the context of a helicopter. The rotor blades each generate a lift component that can be oriented depending on the respective position of the rotor blade relative to the rotor mast. A controlled adjustment of these positions of the rotor blades, and particularly the pitch angle positions of the rotor blades, and the resulting control of the lift and forward thrust of the helicopter is normally achieved by tilting or pivoting each rotor blade along a pitch axis extending in the span width direction of the respective rotor blade.

In one type of pitch control arrangement, a variably tiltable swashplate or pitch control cam disk achieves the desired pitch control pivoting of the rotor blades via connecting rods or the like extending between the swashplate and the rotor blades. As an alternative, in a second type of pitch control arrangement, the pitch angle position of each rotor blade is influenced by a respective servo-actuated flap provided along a trailing edge of the respective rotor blade. In this context, a tilting displacement of the servo-flap causes a change in the aerodynamic flow characteristic of the air flowing over the rotor blade, which in turn causes the rotor blade to pivot about its respective span direction axis so as to change the pitch angle of the rotor blade.

It has also been found that servo-flaps can be used in order to reduce the so-called "blade slap" or slapping noise that is typically caused by the rotating rotor blades due to the alternating effect of each rotor blade interacting with air vortices or flow turbulences generated by and separating from the preceding rotor blade. Used in this context, the servo-flaps are actuated so as to reduce the aerodynamic alternating effects such that the air vortices are weakened and pushed further outward from the rotor blade by a slight pitching and flattening or pulling-in of the rotor blade.

Several prior art references disclose the use of servo-actuated flaps in a rotor blade. U.S. Pat. No. 5,588,800 generally discloses the use of a servo-flap for suppressing the blade slap noise of a rotor blade. U.S. Pat. No. 5,387,083 discloses a servo-flap provided on a rotor blade, wherein the servo-flap is driven by a rotational actuator arranged in the rotor blade. U.S. Pat. No. 5,639,215 discloses a servo-flap arrangement for a rotor blade, wherein the servo-flap is driven by an actuator arranged in the rotor blade either directly or via a linkage mechanism.

The most recent investigations and experiments have also shown that servo-flaps can be provided along the trailing edges of wings of conventional non-rotor aircraft, whereby the servo-flaps have a similar influence on the aerodynamic characteristics as a kink-free curving or cambering of the trailing edge. Thus, the general aerodynamically contoured member or airfoil member outfitted with servo-flaps can also be used as a wing of a conventional non-rotor aircraft.

Common to all of the known arrangements of servo-flaps on airfoil members, either electric motors or hydraulic systems are used as actuators for tilting or deflecting the flaps in a direction toward the suction or vacuum side of the airfoil and in a direction toward the pressure side of the airfoil. Both electric motors and hydraulic systems suffer serious disadvantages as actuators for such servo-flaps, especially in the context of servo-flaps provided on rotor blades of a helicopter. For example, electric motors used as actuators are disadvantageously influenced by the high accelerations (up to 1000 G) that arise in the rotor blade during operation. In this context, the accelerations especially arise from the effective centrifugal forces. Such high accelerations and corresponding forces lead to the tilting or jamming displacement of the various individual rotatable components of the electric motors, which are necessarily arranged with a certain degree of bearing play. For this reason, the operation of such electric motors under high acceleration-force conditions is seriously limited.

On the other hand, the use of hydraulic systems as actuators easily causes the airfoil member to exceed its maximum allowable weight, in view of the relatively high weight of the hydraulic system components. Moreover, the actuating speeds of both electric motors and hydraulic systems are too low to be advantageously used as actuators for trailing edge servo-flaps of air foil members.

SUMMARY OF THE INVENTION

In view of the above, it is an object of the invention to provide an aerodynamically contoured airflow profile member, generally called an airfoil member herein, having a servo-flap and servo-actuator system, which is improved in such a manner that a jamming of the drive components cannot occur during the tilting actuation of the servo-flap, without increasing the weight of the overall airfoil member, in comparison to prior art arrangements. The invention further aims to avoid or overcome the disadvantages of the prior art, and to achieve additional advantages, as apparent from the present specification.

The above objects have been achieved according to the invention in an airfoil member, especially a rotor blade for a helicopter, comprising a root end adapted to be secured to the aircraft on which the airfoil member is to be used, a tip end opposite the root end, an airfoil profile section extending between the root end and the tip end, a leading edge nose and a trailing edge respectively extending along the front and back edges of the airfoil profile section, a suction side cover skin and a pressure side cover skin bounding and defining the exterior contours of the airfoil profile section, at least one servo-flap arranged to form at least a portion of the trailing edge of the airfoil member, and at least one piezoelectric actuator arranged in the interior of the airfoil member and connected to the servo-flap so as to actuate a tilting position adjustment of the servo-flap.

By using at least one piezoelectric actuator for actuating the servo-flap of the inventive airfoil member, the operational flexibility of the airfoil member is increased. A piezoelectric actuator may comprise a piezoelectric solid state element stack made up of a plurality of separate piezoelectric material layers stacked one on top of another in a lengthwise direction of the overall solid state structure, and respective electrodes interposed therebetween for contacting the piezoelectric layers. Respective alternating ones of the electrodes can be selectively energized with voltage of opposite polarity in order to induce the piezoelectric layers to expand in the lengthwise direction and contract in the crosswise direction of the stack. Due to the stacked arrangement, the electrically induced length variations or strains of the individual piezoelectric layers are added to each other, whereby the total achievable working stroke of the stacked solid state structure is considerably increased. Such actuators are characterized by a high actuating speed, a high applied force, and a great resolution of the actuating displacement. Moreover, such piezoelectric actuator systems are compact, light in weight and not subject to a mechanical tilting displacement or jamming of the actuating components, since the actuating movement is generated from within the solid state bodies.

Advantageously, the piezoelectric actuators and the entire actuating system may be arranged inside the airfoil member so that the aerodynamics of the airfoil member are not disadvantageously affected. Moreover, the actuators may especially be oriented so that their strain expansions are directed in the span width direction of the airfoil member. Such an orientation of the actuators minimizes the interfering effects caused by the arising high accelerations and forces, because the primary actuation movements of the actuators occur in a direction parallel to or aligned with the acceleration direction. The final actuation motion for actuating the servo-flaps, which is oriented in the chord length direction, can be provided via suitable transmission mechanisms arranged between the piezoelectric actuators and the servo-flaps. Namely, these transmission mechanisms convert the span width directed motion of the piezoelectric actuators into a chord length directed motion as needed for actuating the servo-flaps.

Preferably, the transmission mechanisms respectively comprise a massive rectangular or quadrangular frame arrangement enclosing and surrounding the respective piezo-electric actuator. The frame arrangement is made up of substantially rigid frame members articulately or bendably connected to each other by integrally formed and continuous leaf-spring-type flexible webs or hinge joints that integrally and flexibly interconnect the several frame members to form a rhomboid hinged rod linkage. This linkage kinematically transforms the length variation of the piezo-electric actuator to an output motion that is redirected by 90° relative to the lengthwise strain of the piezoelectric actuator. This quadrangular frame arrangement with integral hinge joints provides a play-free coupling of the piezoelectric actuator to the servo-flap, which prevents a tilting or jamming displacement of the individual components due to the influence of the arising high accelerations or forces.

The piezoelectric actuators together with the above described transmission mechanisms can be arranged and connected directly to the servo-flaps so as to directly apply the necessary actuating force and movement between the main body of the airfoil member and the servo-flap. In an advantageous alternative, however, connecting rod linkages are arranged between the servo-flaps and the piezoelectric actuators (or more accurately the transmission mechanisms). Thereby, the connecting rod linkages serve to transmit the motion of the piezoelectric actuators to the servo-flaps. In this manner, it is possible to position the actuators themselves at any desired location within the airfoil member, without negatively influencing the operability of the overall system.

Piezoelectric actuators are especially suitable for being subjected to a compressive loading while undergoing a strain elongation. Thus, the present arrangement can further comprise one or more return springs or other tension elements or tension inducing systems to bias the piezoelectric actuators for returning a servo-flap to its initial position by retracting the actuators after the servo-flap has been actuated or deflected by a compressive loading and elongation of the actuators.

Alternatively, according to a preferred embodiment, the inventive arrangement includes at least two piezoelectric actuators rather than a piezoelectric actuator plus a return spring. Namely, a first piezoelectric actuator is provided for achieving the tilting deflection of the servo-flap in a direction toward the suction side of the airfoil member, while a second piezoelectric actuator is provided for achieving the tilting deflection of the servo-flap in a direction toward the pressure side of the airfoil member. In this embodiment, a single actuator is not responsible for tilting the servo-flap in both directions. Instead, the first actuator lifts the servo-flap while elongating under compressive loading, and the second actuator pushes down the servo-flap while also elongating under compressive loading. While each one of the two actuators is carrying out its respective active actuation, the other one of the actuators can be simply allowed to relax, without needing to develop a tensile contracting actuating force. In this manner, the piezoelectric actuators are preferably loaded under compression, and not loaded under tension.

When the present arrangement is to be used in connection with relatively large servo-flaps, which are influenced by rather high wind loads during operation, the arrangement preferably includes at least two first actuators (e.g. a first actuator and a third actuator acting in parallel) and two second actuators (e.g. a second actuator and a fourth actuator acting in parallel). Thereby, each parallel pair of actuators divides the total actuating load between the two respective actuators. In this manner it becomes possible to use several smaller actuators rather than a single high power actuator. Such smaller actuators can be arranged more easily in the airfoil member without disrupting the aerodynamic contour thereof. Also, the division of the actuating function among plural smaller parallel actuators provides a degree of safety redundancy, whereby the other actuators will still remain functional for a partial operability of the servo-flap even if one of the actuators has failed.

As a basic consideration, the piezoelectric actuators can be arranged anywhere within the entire interior of the airfoil member. However, in a preferred embodiment the actuators are arranged within the leading edge nose region. In this manner, the weight of the actuators, which contributes to the determination of the position of the center of gravity within the airfoil member, can be located so that the resulting center of gravity coincides with the desired or required position thereof. In other words, it has been found that by locating the actuators in the leading edge nose region of the airfoil member, a most advantageous relationship with and influence on the overall center of gravity is achieved.

Preferably, the servo-flaps are arranged near the tip end of the airfoil member or rotor blade. This tip end portion of the airfoil member has aerodynamic characteristics that primarily dominate the overall aerodynamic behavior of the total airfoil member, so that a variation or modification of the aerodynamic contour in this area has the greatest effect on the overall aerodynamic behavior of the airfoil member. It should further be understood, however, that the servo-flaps can alternatively or additionally be arranged at other locations along the airfoil member, for example in order to control the pitch angle of the airfoil member or to influence the air vortices or turbulence generated by the airfoil member, or to adaptively match or achieve a desired airfoil profile.

BRIEF DESCRIPTION OF THE DRAWING

In order that the invention may be clearly understood, it will now be described in connection with an example embodiment with reference to the single drawing FIGURE, which schematically shows a perspective view of a broken open portion of a rotor blade including a servo-flap and internally arranged actuators according to the invention.

DETAILED DESCRIPTION OF PREFERRED EXAMPLE EMBODIMENTS AND OF THE BEST MODE OF THE INVENTION

In the example embodiment shown in the single drawing FIGURE, an airfoil member is represented by a helicopter rotor blade 10 that includes an airfoil member body 10A and a servo-flap 20 forming a portion of the trailing edge of the rotor blade 10 in the area of the blade tip end 11. The body 10A of the rotor blade 10 is bounded on the top surface thereof by a suction side cover skin 12, and on the bottom surface thereof by a pressure side cover skin 13. The suction side cover skin 12 has been omitted in the area of the servo-flap 20 in order to allow a clear illustration of the components arranged within the interior of the rotor blade 10.

The servo-flap 20 is tiltably connected via tilting bearings 21 to the body 10A of the rotor blade 10, so as to allow the servo-flap 20 to tilt or pivot about a tilting axis which is not illustrated in particular. In order to actuate the tilting deflection of the servo-flap 20 about the tilting axis, a first piezoelectric stack actuator 31 and a second piezoelectric stack actuator 34 are respectively arranged within the interior of the body 10A of the rotor blade 10. Each of the piezoelectric stack actuators 31 and 34 is oriented so that its lengthwise stacking direction is parallel to the span width direction of the rotor blade 10. By applying an appropriate actuating voltage to the individual piezoelectric layers, these layers expand or strain and thereby elongate the length of the entire stack along the span width direction of the rotor blade 10.

A first transmission mechanism 32 surrounds the first actuator 31 and a second transmission mechanism 35 surrounds the second actuator 34, and respectively act to convert or redirect the spanwise elongation of the actuators 31 and 34 respectively into actuating movements oriented in the chord length direction of the rotor blade 10. To achieve this, each one of the transmission mechanisms 32 and 35 respectively comprises a quadrangular frame made up of substantially rigid frame members 32A or 35A integrally and flexibly connected to each other by integrally formed leaf spring-type hinge webs 32B or 35B, so as to form a rhomboid linkage, which may particularly be a quadrangular linkage having four rigid sides and four flexible joints, or which may be an eight-sided linkage having eight substantially rigid sides and eight flexible joints.

When the piezoelectric stack actuators 31 and 34 respectively undergo an elongation in the span width direction, the rhomboid linkage of the respective associated transmission mechanism 32 and 35 becomes correspondingly longer in the span width direction and responsively narrower in the chord length direction. Thereby, the elongation of the piezoelectric actuators in the spanwidth direction is converted into a tensile or pulling motion in the chord length direction.

A first connecting rod linkage 33 connects the first transmission mechanism 32 to the servo-flap 20, while a second connecting rod linkage 36 connects the second transmission mechanism 35 to the servo-flap 20. These connecting rod linkages transmit the tensile or pulling motion from the transmission mechanisms to the servo-flap. Each connecting rod linkage 33 or 36 respectively comprises a flexible joint 33A or 36A provided between connecting rod members 33B and 33C or 36B and 36C, whereby kinking or bending movements of the rod linkage are possible in the suction side direction or in the pressure side direction. An end of the first connecting rod linkage 33 is hinge-connected to the servo-flap 20 at a location offset from the tilting axis of the servo-flap in a direction toward the suction side. On the other hand, an end of the second connecting rod linkage 36 is hinge-connected to the servo-flap 20 at a location offset from the tilting axis of the servo-flap 20 in a direction toward the pressure side of the rotor blade.

With this arrangement, an elongation of the first piezoelectric actuator 31 under a compressive loading generates a tension force in the first connecting rod linkage 33 through the first transmission mechanism 32, and in turn the tension force and tension movement of the connecting rod linkage 33 applies an offset pivoting moment to the servo-flap 20 about its tilting axis, which responsively tilts the servo-flap 20 toward the suction side of the airfoil 10. On the other hand, a compressive-loading elongation of the second piezoelectric actuator 34 applies a pulling force onto the second connecting rod linkage 36 through the second transmission mechanism 35, whereupon the connecting rod 36 applies an offset pivoting moment to the servo-flap 20 so as to tilt the servo-flap 20 in a direction toward the pressure side of the rotor blade 10. In this manner, the servo-flap 20 can be moved in both directions as desired, by using two counteracting piezoelectric actuators 31 and 34. When the first piezoelectric actuator 31 is being expanded under compression, a tension is applied to the second piezoelectric actuator 34, and vice versa.

Generally, if an airfoil member equipped with a servo-flap is used as a wing of a conventional non-rotor aircraft, then it could be considered that electric motors could be used as actuators for the servo-flap, since such aircraft wings are subjected to much lower accelerations and forces as compared to the rotor blades of helicopters. Such electric motors used as actuators are also capable of moving the servo-flaps against the large arising air pressure loads. However, the achievable actuating speeds of such electric motor actuators are lower than the actuating speeds of piezoelectric actuators, so that the use of piezoelectric actuators according to the invention is also greatly advantageous in the context of non-rotor aircraft wings.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An airfoil member comprising:
   an airfoil body;
   a flap tiltably connected to said airfoil body so as to be tiltable about a tilting axis relative to said airfoil body and so as to form at least a portion of a trailing edge of said airfoil member;
   a first piezoelectric actuator that is arranged in an interior of said airfoil body and that is coupled to said flap so as to be adapted to tiltingly move said flap in a first direction about said tilting axis relative to said airfoil body; and
   a second piezoelectric actuator that is arranged in said interior of said airfoil body and that is coupled to said flap so as to be adapted to tiltingly move said flap in a second direction opposite said first direction about said tilting axis relative to said airfoil body, such that said first and second piezoelectric actuators are arranged and connected to said flap in a counter-acting manner.

2. The airfoil member according to claim 1, configured as a rotor blade for a helicopter.

3. The airfoil member according to claim 1, configured as a wing of a non-rotor aircraft.

4. The airfoil member according to claim 1,
   wherein said airfoil body includes a root end adapted to be connected to an aircraft, a tip end opposite said root end, and an airfoil profile section between said root end and said tip end;
   wherein said airfoil profile section is bounded on a suction side by a suction side cover skin and on a pressure side by a pressure side cover skin, said airfoil profile section has an airfoil body trailing edge forming a portion of said trailing edge of said airfoil member, and said airfoil profile section has a leading edge nose curving between said pressure side cover skin and said suction side cover skin along a leading edge opposite said airfoil body trailing edge; and
   wherein a chord length direction extends between said leading edge nose and said airfoil body trailing edge and a span width direction extends between said root end and said tip end.

5. The airfoil member according to claim 4, wherein said piezoelectric actuators are arranged in said interior of said airfoil body within said leading edge nose.

6. The airfoil member according to claim 4, wherein said flap is arranged relatively nearer to said tip end than to said root end of said airfoil body.

7. The airfoil member according to claim 1,
   wherein said airfoil body includes a root end adapted to be connected to an aircraft, a tip end opposite said root end, an airfoil body trailing edge extending between said root end and said tip end and forming at least a portion of said trailing edge of said airfoil member, and a leading edge extending between said root end and said tip end opposite said airfoil body trailing edge;
   wherein a chord length direction extends between said leading edge and said airfoil body trailing edge and a span width direction extends between said root end and said tip end;
   wherein each said piezoelectric actuator respectively comprises at least one piezoelectric element, exhibits a piezoelectric elongation in an elongation direction, and is arranged so that said elongation direction is oriented parallel to said span width direction; and
   wherein said airfoil member further comprises first and second mechanical transmission mechanisms that are coupled respectively between said first and second piezoelectric actuators and said flap and are adapted to redirect and transmit said piezoelectric elongation of said respective piezoelectric actuators into an actuating motion applied to said flap.

8. The airfoil member according to claim 7, wherein each said transmission mechanism is configured and adapted to redirect said piezoelectric elongation oriented parallel to said span width direction into said actuating motion which is a tensile motion oriented parallel to said chord length direction.

9. The airfoil member according to claim 7, wherein each said transmission mechanism comprises a linkage frame comprising frame members and flexible hinge webs integrally formed onto said frame members so as to integrally and flexibly connect said frame members to each other.

10. The airfoil member according to claim 9, wherein each respective said piezoelectric actuator is arranged within said respective transmission mechanism to be surrounded by said linkage frame, and wherein said linkage frame is a rhomboid parallelogram linkage frame.

11. The airfoil member according to claim 9, wherein said linkage frame is coupled directly to said flap.

12. The airfoil member according to claim 9, further comprising a respective connecting rod linkage interposed and connected between said linkage frame and said flap.

13. The airfoil member according to claim 1, further comprising connecting rod linkages respectively interposed and connected between said piezoelectric actuators and said flap.

14. The airfoil member according to claim 13, wherein each said connecting rod linkage extends perpendicularly to said trailing edge, comprises two rod members and a hinge joint articulately interconnecting said two rod members, and is pivotally connected to said flap at a location offset from said tilting axis.

15. The airfoil member according to claim 1, further comprising return springs respectively connected to said piezoelectric actuators so as to exert a return biasing force counteracting a respective motion of said piezoelectric actuators.

16. The airfoil member according to claim 1, further comprising:
   a third piezoelectric actuator that is arranged in said interior of said airfoil body and that is coupled to said flap in a parallel functional manner relative to said first piezoelectric actuator so as to be able to tiltingly move said flap in said first direction about said tilting axis relative to said airfoil body together with said first piezoelectric actuator; and
   a fourth piezoelectric actuator that is arranged in said interior of said airfoil body and that is coupled to said flap in a parallel manner relative to said second piezoelectric actuator so as to be able to tiltingly move said flap in said second direction about said tilting axis relative to said airfoil body together with said second piezoelectric actuator.

17. The airfoil member according to claim 1, further comprising another piezoelectric actuator that is arranged in said interior of said airfoil body and that is coupled to said flap in a parallel manner relative to said first piezoelectric actuator so as to be able to tiltingly move said flap in said first direction about said tilting axis relative to said airfoil body together with said first piezoelectric actuator.

18. The airfoil member according to claim 1, excluding any electric motor connected to said flap and excluding any hydraulic system connected to said flap.

* * * * *

UNITED STATES PATENT AND TRADEMARK OFFICE
CERTIFICATE OF CORRECTION

PATENT NO. : 6,231,013 B1
DATED : May 15, 2001
INVENTOR(S) : Jaenker

Page 1 of 1

It is certified that error appears in the above-identified patent and that said Letters Patent is hereby corrected as shown below:

Title page,
Item [56], References Cited, please add the following:

OTHER DOCUMENTS
-- Article entitled "Development of High-Performing Piezoelectric Actuators for Transport Systems", presented at "ACTUATOR 98" Conference of Bremen Exposition, Bremen, Germany, Messe Bremen GmbH, June 17-19, 1998, by P. Jaenker et al., Daimler-Benz AG Research and Technology. --

Signed and Sealed this

Twelfth Day of March, 2002

Attest:

Attesting Officer

JAMES E. ROGAN
Director of the United States Patent and Trademark Office